United States Patent
Du et al.

(10) Patent No.: US 11,541,483 B2
(45) Date of Patent: Jan. 3, 2023

(54) CONTROL DEVICE AND METHOD FOR FORMATION OF WELD SEAM

(71) Applicant: Tsinghua University, Beijing (CN)

(72) Inventors: Dong Du, Beijing (CN); Guodong Peng, Beijing (CN); Boce Xue, Beijing (CN); Li Wang, Beijing (CN); Baohua Chang, Beijing (CN)

(73) Assignee: Tsinghua University, Beijing (CN)

( * ) Notice: Subject to any disclaimer, the term of this patent is extended or adjusted under 35 U.S.C. 154(b) by 351 days.

(21) Appl. No.: 16/863,380

(22) Filed: Apr. 30, 2020

(65) Prior Publication Data

US 2020/0406404 A1  Dec. 31, 2020

Related U.S. Application Data (63) Continuation of application No. PCT/CN2019/121403, filed on Nov. 28, 2019.

(30) Foreign Application Priority Data

Jun. 28, 2019  (CN) .......................... 201910579693.7

(51) Int. Cl.
*B23K 31/12* (2006.01)
*B23K 9/02* (2006.01)
(Continued)

(52) U.S. Cl.
CPC .............. *B23K 31/125* (2013.01); *B23K 9/02* (2013.01); *B23K 9/0953* (2013.01); *B23K 9/0956* (2013.01); *B23K 9/16* (2013.01)

(58) Field of Classification Search
None
See application file for complete search history.

(56) References Cited

U.S. PATENT DOCUMENTS

| 4,613,743 A | 9/1986 | Nied et al. |
| 4,733,051 A | 3/1988 | Nadeau et al. |
| 4,767,911 A | 8/1988 | Maram et al. |
| 5,086,207 A | 2/1992 | Deam |

(Continued)

FOREIGN PATENT DOCUMENTS

| CN | 103506756 | 1/2014 |
| CN | 104014905 | 9/2014 |

(Continued)

OTHER PUBLICATIONS

Zhang et al., Closed-Loop Control of Weld Penetration Using Front-Face Vision Sensing, 1993, Proceedings of the Institution of Mechanical Engineers, Part I: Journal of Systems and Control Engineering; 207(1):27-34 (Year: 1993).*

(Continued)

*Primary Examiner* — Brian W Jennison
*Assistant Examiner* — Kevin Guanhua Wen
(74) *Attorney, Agent, or Firm* — Levine Bagade Han LLP (57) ABSTRACT

The present invention discloses a control device and method for formation of a weld seam based on frontal visual sensing of a weld pool. In the present disclosure, structural light is adopted to irradiate the concave surface of the weld pool, and a visual sensor is adopted to acquire corresponding structured light images. The weld pool depression feature is acquired through image processing. The welding current is adjusted in real time to maintain the weld pool depression feature constant, and thus the uniform backside width of the weld seam can be acquired to achieve uniform and consistent penetration of the weld seam. The present disclosure only relies on the structural light information on the topside of the weld pool to achieve the control of formation of the weld seam and can be applied to the filler-wire-free DC gas tungsten arc welding of tight butt joints.

8 Claims, 4 Drawing Sheets

(51) Int. Cl.
 B23K 9/16 (2006.01)
 B23K 9/095 (2006.01)

(56) References Cited

U.S. PATENT DOCUMENTS

| | | | |
|---|---|---|---|
| 5,481,085 A | 1/1996 | Kovacevic et al. | |
| 6,084,205 A | 7/2000 | Sheaffer et al. | |

FOREIGN PATENT DOCUMENTS

| | | | | |
|---|---|---|---|---|
| CN | 204221169 | | 3/2015 | |
| CN | 105414710 | | 3/2016 | |
| CN | 107127432 | | 9/2017 | |
| CN | 107798330 A | * | 3/2018 | ............ G06V 10/245 |
| CN | 108226168 | | 6/2018 | |
| CN | 108274095 | | 7/2018 | |
| CN | 108856978 | | 11/2018 | |
| CN | 109202283 | | 1/2019 | |
| CN | 109483017 A | * | 3/2019 | ............ B25J 9/1664 |
| CN | 109741311 A | * | 5/2019 | ............... G06T 7/00 |
| CN | 110193679 | | 9/2019 | |
| EP | 1497069 B1 | * | 9/2015 | ............. B23K 9/095 |
| ES | 2280568 T3 | * | 9/2007 | ............. B23K 9/1336 |
| JP | 2018192524 A | * | 12/2018 | ............. B23K 9/095 |
| KR | 101683044 | | 12/2016 | |

OTHER PUBLICATIONS

Machine translation of CN 109741311 A performed on Jun. 7, 2022, Xiong et al. (Year: 2019).*
Machine translation of CN 109483017 A performed on Jun. 7, 2022, Xiao et al. (Year: 2019).*
Machine translation of JP 2018192524 A performed on Jun. 8, 2022, Okamoto et al. (Year: 2018).*
Machine translation of CN 107798330 A performed on Jun. 8, 2022, Lv et al. (Year: 2018).*
Machine translation of ES 2280568 T3 performed on Jun. 8, 2022, Wimroither (Year: 2007).*
Huang, Jiankang et al., "The transient behaviours of free surface in a fully penetrated weld pool in gas tungsten arc welding," Journal of Manufacturing Processes, 36:405-416, 2018.
Jiang, Tian-sheng et al., "Relationship between weld pool shape features and penetration state at different currents," Welding Technology, vol. 46, No. 11, pp. 14-18, Nov. 2017.
Wu, C.S. et al., "Analysis on dynamic development of surface depression of full-penetrated weldpool," Jinshu Xuebao/Acta Metallurgica Sinica, vol. 42, No. 8, pp. 865-869, 2006.
Zhang, Y.M., "Study of adaptive top-vision control for full penetration in TIG welding," Doctoral thesis, Harbin Institute of Technology, pp. 9-162, Dec. 31, 1990.

* cited by examiner

CONTROL DEVICE AND METHOD FOR FORMATION OF WELD SEAM

CROSS-REFERENCE TO RELATED APPLICATIONS

This application is a continuation of International Patent Application Number PCT/CN2019/121403 filed Nov. 28, 2019, which claims priority Chinese Patent Application No. 2019105796937 filed Jun. 28, 2019, entitled "Control Device and Method for Formation of Weld Seam", the contents of which are incorporated herein by reference in their entireties.

FIELD OF TECHNOLOGY

The present disclosure relates to the technical field of welding quality control, and specifically to a control device and method for formation of a weld seam based on frontal visual sensing of a weld pool.

BACKGROUND

Welding is a distinctly important technology in metal processing and manufacturing, and it is also the only optional manufacturing method to ensure the structural sealing property of cabins and pressure vessels. Stability, high efficiency and high precision are goals pursued by modern production. It is an inevitable tendency of modern production to replace the inefficient manual welding with robot automatic welding having good repeatability and high efficiency. However, it is difficult for the robot automatic welding that relies on fixed welding specifications to deal with the uneven penetration of a weld seam caused by changes in groove clearance, changes in heat dissipation conditions, weld joint mismatch and the like during the actual production process.

From the current status of the research and production application of real-time detection and control of welding quality at home and abroad, there are several sensing methods for the penetration state during welding: direct measurement of backside weld width, traditional sensing technology, visual sensing technology and multi-sensing technology. The direct measurement of backside weld width is a very effective way to ensure the quality of penetration. However, in practical applications, it is often limited by the workpiece and tooling structure and space size. It is difficult to fix the sensor under the weld joint. Hence, it is necessary to infer the penetration state by collecting the frontal information of the weld pool and weld bead. The traditional sensing technology includes ultrasonic detection, infrared thermometry, and weld pool oscillation detection. Wherein the ultrasonic detection method obtains the penetration depth by determining the solid-liquid interface of the weld pool with ultrasonic signals. The ultrasonic detection method can be applicable in both joint tracking and real-time detection of weld defects. However, the influence of the temperature difference in the welding zone on the wave velocity limits the accuracy of this method and the non-contact ultrasonic testing equipment is high in cost. The infrared thermometry method infers the penetration state based on the temperature of the welding zone. However, the accuracy of the infrared thermometry is affected by the fluctuations in the thermal emissivity and the surface state of the workpiece. The natural oscillation frequency of the weld pool reflects the size of the weld pool and the degree of penetration. The oscillation frequency of the weld pool can be obtained by detecting the fluctuation frequency of the arc voltage, the changes in the arc length, or the periodic changes in the light pattern specularly reflected by the surface of the weld pool, thereby completing the closed-loop control of the penetration of weld pool. However, the weld pool oscillation detection is only applicable for the pulse welding with significant oscillations in the weld pool, and the signal processing is difficult. The visual sensing technology establishes a mapping relation between the geometric characteristics and grayscale characteristics of weld pool images and the penetration state weld pool through weld pool image processing. The mapping relation is not straightforward and usually modeled by the artificial neural network. The visual sensing technology can obtain very rich information. However, because the modeling is complex, the required training data is large, and the applicability of the model depends on the adequacy of the process test, it is still in the research stage. The multi-sensing technology determines the penetration status by combining various welding process signals such as images, voltages, and currents. It is complex in the operation mode and has similar modeling problems as the visual sensing technology.

SUMMARY

(I) Technical Problem to be Solved

An objective of the present disclosure is to provide a control device and method for formation of a weld seam based on frontal visual sensing of the weld pool, which solves the problem of uneven penetration of the weld seam existing in the prior art.

(II) Technical Solutions

In order to solve the technical problem above, the present disclosure provides a control device for formation of a weld seam based on frontal visual sensing of a weld pool, which includes a welding unit, a visual sensing unit, and a calculation control unit;

wherein the welding unit includes a welding torch configured to weld a welding workpiece;

the visual sensing unit includes a structured light source and a visual sensor respectively disposed on left and right sides of the welding torch; wherein the structured light source is configured to emit single line structured light and irradiate the weld pool by the single line structured light; the visual sensor is configured to collect structured light spot images formed by irradiating the single line structured light on surfaces of the weld pool and the welding workpiece and output the structured light spot images;

the calculation control unit includes a computer, wherein the computer is connected to the visual sensor and is configured to receive the structured light spot images and process the structured light spot images, acquire a current value of the weld pool depression feature, and to adjust the welding current of the welding torch based on a deviation between the current value and an expected value of the weld pool depression feature.

Further, the welding unit further includes a welding power source, wherein the welding torch is connected to the welding power source, and the welding power source is connected to the computer; the welding power source is configured to output a welding current to the welding torch, and the computer adjusts the welding current of the welding torch by the welding power source.

Further, the welding unit further includes a cooling water tank configured to cool the welding torch; wherein the cooling water tank is provided with a water tank water inlet and a water tank water outlet, and the welding torch is provided with a welding torch water inlet and a welding torch water outlet; and the water tank water outlet is connected to the welding torch water inlet, the welding torch water outlet is connected to the water tank water inlet, and the cooling water tank is connected to the welding power source.

Further, the welding unit further includes a shielding gas storage tank, wherein the shielding gas storage tank is connected to the welding power source, and provides shielding gas to the welding torch through the welding power source.

Further, a band-pass filter is installed on the visual sensor, the band-pass filter allows the single line structured light to pass through, and filters out arc interference of other wavebands.

Specifically, the device further includes a mounting plate, wherein the structured light source, the visual sensor, and the welding torch are mounted on the mounting plate, respectively; and axes of the structured light source, the visual sensor, and the welding torch are on a same plane.

Specifically, the welding workpiece is disposed under the welding torch, the structured light source and the visual sensor are respectively aligned with the welding workpiece, and the axis of the structured light source and that of the visual sensor are symmetric with respect to the axis of the welding torch, respectively.

In order to solve the technical problem above, the present disclosure also provides a control method for formation of a weld seam based on frontal visual sensing of a weld pool. The control device for formation of a weld seam above is adopted in the method including:

setting initial welding parameters of a welding torch and acquiring an expected value of the weld pool depression feature;

turning on a structured light source, irradiating the weld pool with a single line structured light, and allowing the welding torch to begin welding;

collecting structured light spot images formed by irradiating the single line structured light on the surfaces of the weld pool and the welding workpiece and outputting the structured light spot images to a computer by a visual sensor;

processing the structured light spot images, acquiring a current value of the weld pool depression feature, and adjusting the welding current of the welding torch based on a deviation between the current value and the expected value of the weld pool depression feature by the computer.

Further, the acquiring the current value of the weld pool depression feature specifically includes:

selecting a region of interest containing light spots as an object on which subsequent image processing is performed from the structured light spot images, performing threshold segmentation and dilation operation of morphology on the region of interest to acquire binary images and eliminating noisy connected domains in connected domains of the binary images to acquire a foreground area;

performing centerline extraction on original images inside the foreground area, dividing the extracted centerline into a straight line segment formed by irradiating the single line structured light on a welding workpiece base material and a curved line segment formed by irradiating the single line structured light on the concave surface of the weld pool;

fitting the straight line segment using a linear equation to acquire a straight line L, fitting the curved line segment using a polynomial equation to acquire a curved line C, and acquiring an area enclosed by the straight line L and the curved line C, wherein the area is used as the depression area S of the weld pool; and performing square root operation on depression area S of the weld pool to acquire the current value of the weld pool depression feature $\sqrt{S}$.

Further, the acquiring a foreground area specifically includes:

setting a perimeter of the connected domain of the binary images as P and the area as A; and eliminating connected domains which satisfy $A/P^2 > \varepsilon$ and using remaining connected domains after the elimination in the connected domains of the binary images as the foreground area;

wherein $\varepsilon$ is a constant selected based on actual experience, and takes a value in the range of [0.01, 0.06].

Further, the acquiring the expected value of the weld pool depression feature specifically includes:

setting an expected value of the backside width of the weld seam according to the requirements of the degree of penetration of the weld seam; and acquiring a corresponding expected value of the weld pool depression feature according to a mapping relation between the weld pool depression feature and the expected value of the backside width of the weld seam.

(III) Beneficial Effects

The technical solutions above of the present disclosure have the following advantages:

The control device and method for formation of a weld seam provided by the present disclosure perform welding operation on a welding workpiece by a welding torch, irradiate a weld pool with single line structured light emitted by a structured light source, and collect structured light spot images formed by irradiating the single line structured light on the surfaces of the weld pool and welding workpiece, and output the structured light spot images to a computer; process the structured light spot images by the computer, acquire a current value of the weld pool depression feature, and adjust the welding current of the welding torch based on the deviation between the current value and an expected value of the weld pool depression feature. By adjusting the welding current in real time, the present disclosure ensures that the weld pool depression feature is constant, so that the uniform and consistent backside width of the weld seam can be acquired, thereby achieving uniform and consistent weld penetration. And the present application has the advantages of simple structure, low cost, and low implementation difficulty and is easy to use in production practice.

The control device and method for formation of a weld seam provided by the present disclosure can effectively control the formation of the weld seam, and can be applied to the filler-wire-free DC gas tungsten arc welding of tight butt joints, achieve filler-wire-free DC gas tungsten arc welding seams with uniform and consistent penetration, and is especially suitable for welding without backing of large aluminum alloy structural parts in the aerospace manufacturing field.

| 1 welding torch | 2 welding workpiece |
| 3 structured light source | 4 visual sensor |
| 5 computer | 6 welding power source |
| 7 cooling water tank | 8 shielding gas storage tank |
| 9 band-pass filter | 10 mounting plate |

DETAILED DESCRIPTION

In order to make the objectives, technical solutions and advantages of the embodiments of the present disclosure more clear, the technical solutions in the embodiments of the present disclosure are clearly and completely described in the following with reference to the accompanying drawings in the embodiments of the present disclosure. Obviously, the described embodiments are a part of the embodiments of the present disclosure, and not all of the embodiments. All other embodiments obtained by a person of ordinary skill in the art based on the embodiments of the present disclosure without any creative work belong to the scope of the present disclosure.

Figure 1:
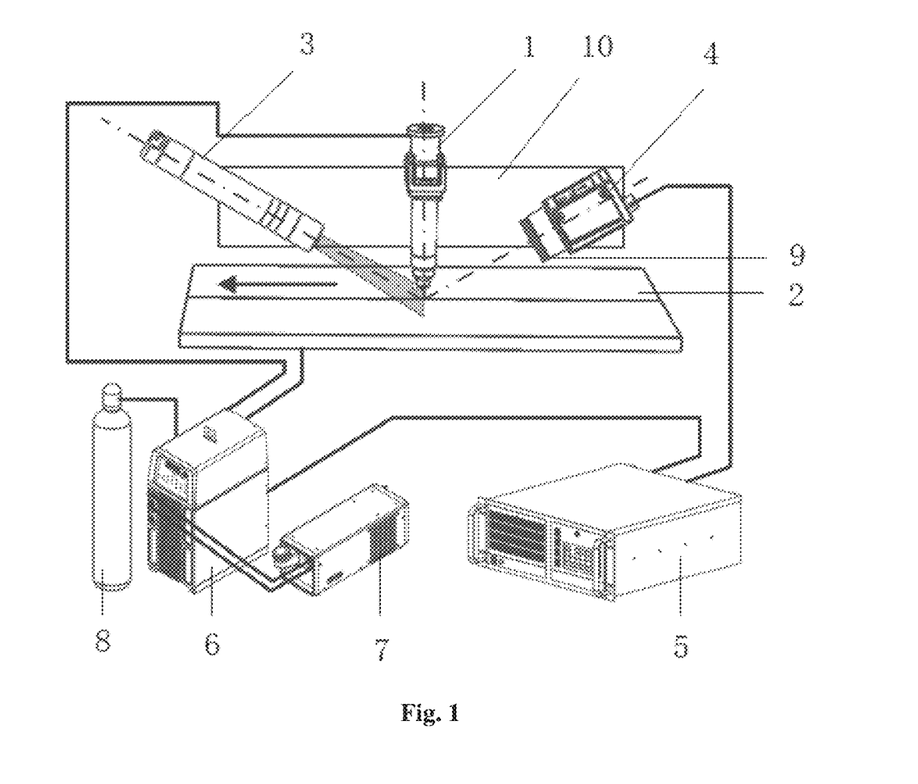
FIG. 1 is a structural diagram of the control device for formation of a weld seam based on frontal visual sensing of a weld pool according to an embodiment of the present disclosure.

As shown in FIG. 1, the embodiments of the present disclosure provide a control device for formation of a weld seam based on the frontal visual sensing of a weld pool, which includes a welding unit, a visual sensing unit, and a calculation control unit.

The welding unit includes a welding torch 1 configured to weld a welding workpiece 2.

The visual sensing unit includes a structured light source 3 and a visual sensor 4. The structured light source 3 and the visual sensor 4 are respectively disposed on left and right sides of the welding torch 1. Wherein, the structured light source 3 is configured to emit single line structured light and irradiate the weld pool by the single line structured light. The visual sensor 4 is configured to collect structured light spot images formed by irradiating the single line structured light on the surfaces of the weld pool and the welding workpiece 2 and output the structured light spot images.

The calculation control unit includes a computer 5, wherein the computer 5 is connected to the visual sensor 4. The computer 5 is configured to receive structured light spot images output by the visual sensor 4 and process the structured light spot images, acquire a current value of the weld pool depression feature, and to adjust the welding current of the welding torch 1 based on a deviation between the current value and an expected value of the weld pool depression feature.

By adjusting the welding current of the welding torch 1 in real time, the control device for formation of a weld seam based on the frontal visual sensing of the weld pool of the embodiments of the present disclosure ensures that the weld pool depression feature is constant, so that the uniform and consistent backside width of the weld seam can be acquired, thereby achieving uniform and consistent weld penetration. And the device has the advantages of simple structure, low cost, and low implementation difficulty and is easy to use in production practice.

The control device for formation of a weld seam described by the embodiments of the present disclosure can effectively control the formation of the weld seam, and can be applied to the filler-wire-free DC gas tungsten arc welding of tight butt joints, achieve filler-wire-free DC gas tungsten arc welding seams with uniform and consistent penetration, and is especially suitable for welding without backing of large aluminum alloy structural parts in the aerospace manufacturing field.

In a further embodiment of the present disclosure, the welding unit further includes a welding power source 6, wherein the welding torch 1 is connected to the welding power source 6, and the welding power source 6 is configured to output the welding current to the welding torch 1.

The welding power source 6 is connected to the computer 5, and the computer 5 can adjust the welding current output by the welding power source 6 to the welding torch 1 in real time, thereby achieving the real-time adjustment of the welding current of the welding torch 1.

In a further embodiment of the present disclosure, the welding unit further includes a cooling water tank 7 provided with a water tank water inlet and a water tank water outlet. The welding torch 1 is provided with a welding torch water inlet and a welding torch water outlet; and the water tank water outlet is connected to the welding torch water inlet, the welding torch water outlet is connected to the water tank water inlet. The cooling water tank 7 is configured to cool the welding torch 1.

The cooling water tank 7 is connected to the welding power source 6 and the welding power source 6 can provide the operation of the cooling water tank 7 with electric energy.

In a further embodiment of the present disclosure, the welding unit further includes a shielding gas storage tank 8, wherein the shielding gas storage tank 8 is connected to the welding power source 6, and the shielding gas storage tank 8 provides the shielding gas to the welding torch through the welding power source 6, thereby performing DC gas tungsten arc welding by the welding torch 1.

In a further embodiment of the present disclosure, a band-pass filter 9 is installed on the visual sensor 4. By arranging the band-pass filter 9, it allows the single line structured light emitted by the structured light source 3 to pass through and irradiate the surface of the weld pool, and filters out arc interference of other wavebands.

In an embodiment of the present disclosure, the device further includes a mounting plate 10, wherein the structured light source 3, the visual sensor 4, and the welding torch 1 are mounted on the mounting plate 10, respectively.

Wherein, the axes of the structured light source 3, the visual sensor 4, and the welding torch 1 are on the same plane.

Wherein, the welding workpiece 2 is disposed under the welding torch 1, the structured light source 3 and the visual sensor 4 are respectively aligned with the welding workpiece 2, and an axis of the structured light source 3 and that of the visual sensor 4 are symmetric with respect to the axis of the welding torch 1, respectively. This structure setting mode can make the reflection of the single line structured light on the surface of the weld pool into a specular reflection.

In an embodiment, an included angle between the axis of the structured light source 3 and that of the welding torch 1 may be set to be 70°. Similarly, an included angle between the axis of the visual sensor 4 and that of the welding torch 1 is also set to be 70°.

Figure 2:
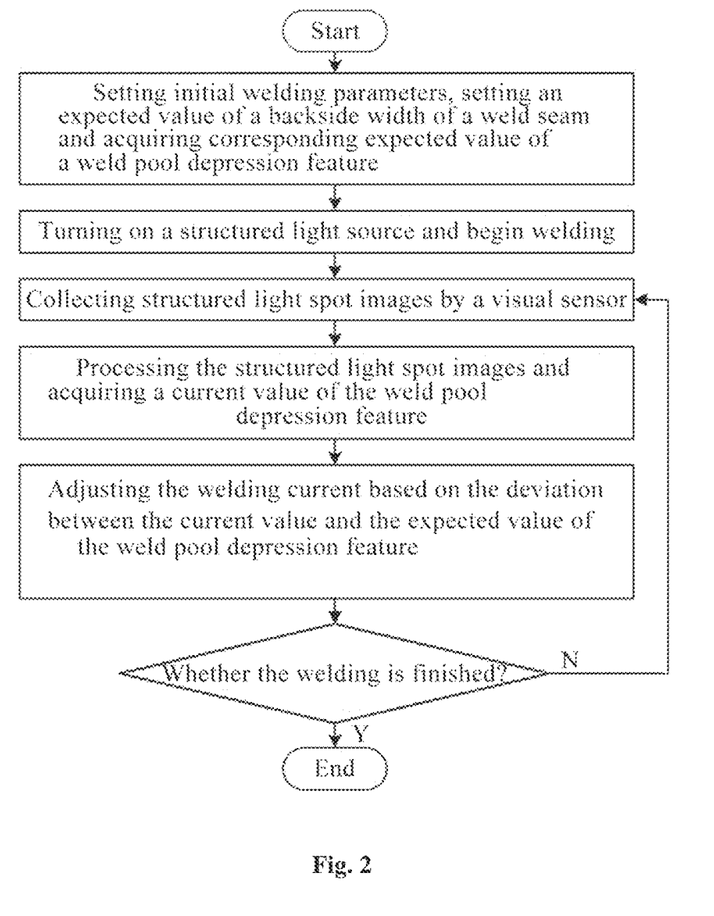
FIG. 2 is a flowchart of the control method for formation of a weld seam based on frontal visual sensing of a weld pool according to an embodiment of the present disclosure.

As shown in FIG. 2, the embodiments of the present disclosure also provide a control method for formation of a weld seam. The control device for formation of a weld seam in the embodiments above is adopted in the method including:

setting initial welding parameters of a welding torch and acquiring an expected value of the weld pool depression feature;

turning on a structured light source, irradiating surfaces of the weld pool and welding workpiece with single line structured light emitted by the structured light source, and allowing the welding torch to begin welding;

collecting structured light spot images formed by irradiating the single line structured light on the surfaces of the weld pool and the welding workpiece and outputting the structured light spot images to a computer by a visual sensor;

processing the structured light spot images, acquiring a current value of the weld pool depression feature by the computer;

adjusting a welding current of the welding torch based on a deviation between the current value and the expected value of the weld pool depression feature by the computer.

Figure 3:
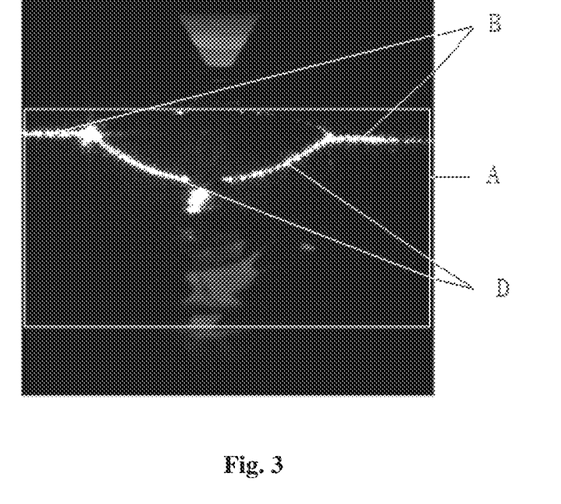
FIG. 3 shows a structured light spot image collected by a visual sensor in an embodiment of the present disclosure.

FIG. 3 shows the structured light spot image collected by the visual sensor, wherein the block shown by A is an area of interest, B is the structured light reflected from the surface of the welding workpiece on both sides of the weld seam, and D is the structured light reflected from the concave surface of the weld pool.

The control method for formation of a weld seam of the embodiments of the present disclosure can adjust the welding current of the welding torch in real time, thereby ensuring that the weld pool depression feature is constant, so as to acquire a uniform and consistent backside width of the weld seam and achieve a uniform and consistent welding penetration.

The control method for formation of a weld seam of the present disclosure can effectively control the formation of the weld seam, and can be applied to the filler-wire-free DC gas tungsten arc welding of tight butt joints, achieve filler-wire-free DC gas tungsten arc welding seams with uniform and consistent penetration, and is especially suitable for welding without backing of large aluminum alloy structural parts in the aerospace manufacturing field.

Figure 4:
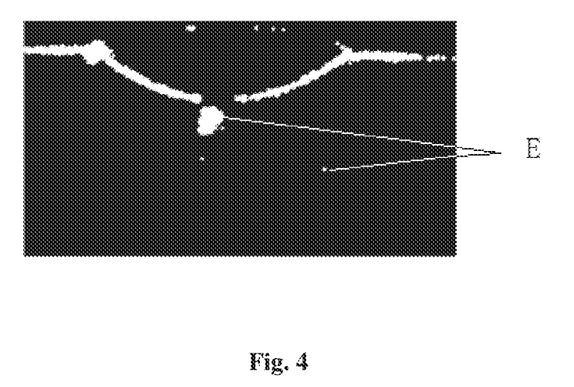
FIG. 4 shows a binary image acquired by performing threshold segmentation and dilation operation of morphology on an area of interest of an image in an embodiment of the present disclosure.
Figure 5:
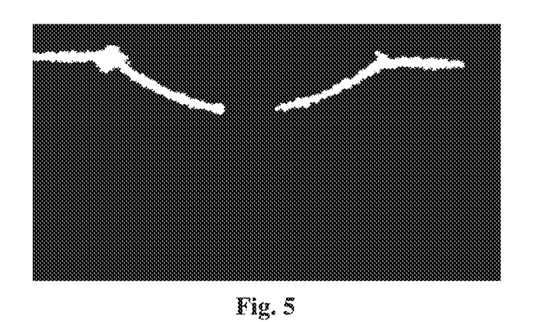
FIG. 5 shows a foreground area acquired by eliminating a noisy connected domain from a binary image according to an embodiment of the present disclosure.

In a further embodiment of the present disclosure, the acquiring the current value of the weld pool depression feature specifically includes the following steps:

selecting a region of interest containing light spots as an object on which subsequent image processing is performed from the structured light spot images, performing threshold segmentation and dilation operation of morphology on the region of interest to acquire binary images and eliminating noisy connected domains in connected domains of the binary images to acquire a foreground area. FIG. 4 shows an acquired binary image, where E is the noisy connected domain. FIG. 5 shows an acquired foreground area.

Figure 6:
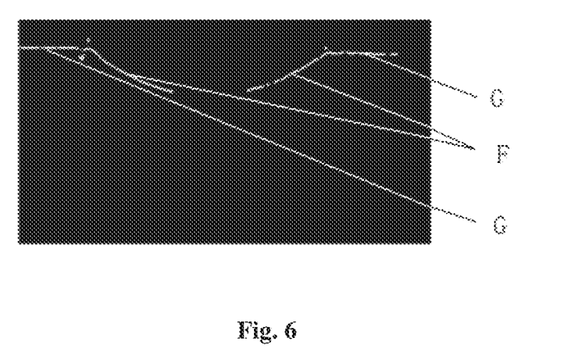
FIG. 6 shows results acquired by performing centerline extraction on an original image in a foreground area according to an embodiment of the present disclosure.

Centerline extraction is performed on original images inside the foreground area, the extracted centerline is divided into a straight line segment formed by irradiating the single line structured light on a welding workpiece base material and a curved line segment formed by irradiating the single line structured light on the concave surface of the weld pool. FIG. 6 shows a result image acquired by performing centerline extraction on the original images inside the foreground area, wherein G is the straight line segment formed by irradiating the single line structured light on the welding workpiece base material and F is the curved line segment formed by irradiating the single line structured light on the concave surface of the weld pool.

Figure 7:
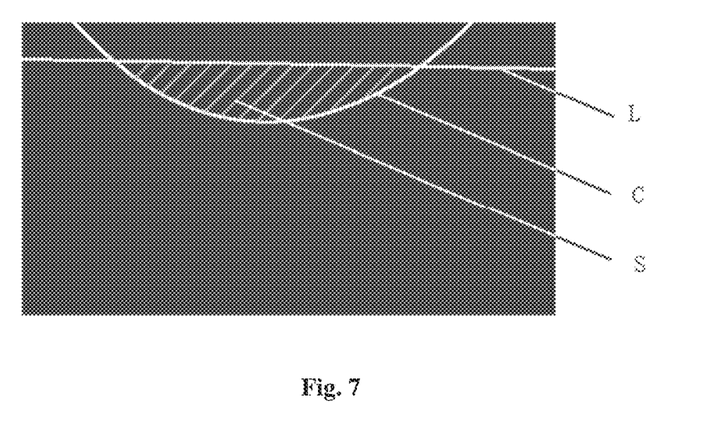
FIG. 7 shows results acquired by fitting a straight line segment and a curved line segment of a center line according to an embodiment of the present disclosure.

The straight line segment is fit using a linear equation to acquire a straight line L, the curved line segment is fit using a polynomial equation to acquire a curved line C, as shown in FIG. 7, an area enclosed by the straight line L and the curved line C is obtained, wherein the area is used as the depression area S of the weld pool and the area of the shaded part in FIG. 7 is the depression area S of the weld pool.

Square root operation is performed on depression area S of the weld pool to acquire the current value of the weld pool depression feature $\sqrt{S}$.

In a further embodiment of the present disclosure, the acquiring the foreground area specifically includes the following steps:

setting a perimeter of the connected domain of the binary image as P and the area as A; and eliminating connected domains which satisfy $A/P^2 > \varepsilon$ and using remaining connected domains after the elimination in the connected domains of the binary images as the foreground area;

wherein $\varepsilon$ is a constant selected based on actual experience, and takes a value in the range of [0.01, 0.06] in an embodiment of the present disclosure.

In a further embodiment of the present disclosure, the acquiring the expected value of the weld pool depression feature specifically includes the following steps:

setting an expected value of the backside width of the weld seam according to requirements of the degree of penetration of the weld seam; and acquiring a corresponding expected value of the weld pool depression feature according to a mapping relation between the weld pool depression feature and the expected value of the backside width of the weld seam.

Wherein, the mapping relation between the weld pool depression feature and the expected value of the backside width of the weld seam is acquired through modeling and simulation of welding processes under different welding currents and experiments.

In a further embodiment of the present disclosure, the initial welding parameters of the welding torch include an initial welding current, and the initial welding current is acquired according to the material and thickness of the welding workpiece.

The principle on which the control method for formation of a weld seam described in the embodiments of the present disclosure is based lies in:

with regard to a welding process without filler wire of tight butt workpieces, the backside of a weld seam with uniform penetration and consistent morphology means the front of the weld seam with consistent concave degree since the volume of metal before and after welding is basically unchanged. Therefore, unlike that the traditional two-dimensional image information of the weld pool is used, the depression information of the weld pool in the present disclosure is configured to guide the welding process to acquire a weld seam with the consistent depression amount on the topside, thereby indirectly acquiring the backside of weld seam with consistent width, and then achieving uniform and consistent penetration.

The control method for formation of a weld seam of the embodiments of the present disclosure can provide an effective control method for formation of weld seam to filler-wire-free DC gas tungsten arc welding of tight butt joints. Compared with the traditional two-dimensional image of the weld pool, the present disclosure has a high signal-to-noise ratio, simple processing, and a direct relation with the degree of penetration, so that the control effect is more stable and good because the structural light information of the weld pool is adopted.

To sum up, the control device and method for formation of a weld seam of the embodiments of the present disclosure ensures that the amount of the weld pool depression feature is constant by adjusting the welding current in real time, therefore a uniform and consistent backside width of the weld seam can be obtained, so that a uniform and consistent welding penetration is achieved.

In the description of the present disclosure, it is to be noted that unless explicitly stated and defined otherwise, the terms "connected with," and "connected to" shall be understood broadly, for example, they may be either fixedly connected or detachably connected, or can be integrated; they may be mechanically connected, or electrically connected; they may be directly connected, or indirectly connected through an intermediate medium. The specific meanings of the terms above in the present disclosure can be understood by a person of ordinary skill in the art in accordance with specific conditions.

In the description of the present disclosure, unless otherwise stated, "several" means one or more; "multiple" means two or more; the orientation or positional relations indicated by terms such as "upper", "lower", "left", "right", "inside", "outside", etc. are based on the orientation or positional relationship shown in the drawings, and are merely for the convenience of describing the present disclosure and simplifying the description, rather than indicating or implying that the device or component referred to must have a particular orientation, is constructed and operated in a particular orientation, and thus cannot be construed as limiting the disclosure.

Finally, it should be noted that the above embodiments are only used to explain the technical solutions of the present disclosure, and are not limiting thereto; although the present disclosure is described in detail with reference to the foregoing embodiments, it should be understood by those of ordinary skill in the art that they can still modify the technical solutions described in the foregoing embodiments and make equivalent replacements to a part of the technical features; and these modifications and substitutions do not depart the essence of the corresponding technical solutions from the spirit and scope of the technical solutions of the various embodiments of the present disclosure.

We claim:

1. A control method for formation of a weld seam based on frontal visual sensing of a weld pool, comprising:
setting initial welding parameters of a welding torch and acquiring an expected value of a weld pool depression feature; wherein the acquiring the expected value of the weld pool depression feature comprises: setting an expected value of a backside width of the weld seam according to requirements of a degree of penetration of the weld seam; and acquiring a corresponding expected value of the weld pool depression feature according to a mapping relation between the weld pool depression feature and the expected value of the backside width of the weld seam;
turning on a structured light source, irradiating the weld pool with single line structured light, and allowing the welding torch to begin welding;
collecting structured light spot images formed by irradiating the single line structured light on surfaces of the weld pool and a welding workpiece and outputting the structured light spot images to a computer by a visual sensor;
processing the structured light spot images, acquiring a current value of the weld pool depression feature, and adjusting a welding current of the welding torch based on a deviation between the current value and the expected value of the weld pool depression feature by the computer;
wherein the acquiring the current value of the weld pool depression feature comprises:
selecting a region of interest containing light spots as an object on which subsequent image processing is performed from the structured light spot images, performing threshold segmentation and dilation operation of morphology on the region of interest to acquire binary images and eliminating noisy connected domains in connected domains of the binary images to acquire a foreground area;
performing centerline extraction on original images inside the foreground area, dividing the extracted centerline into a straight line segment formed by irradiating the single line structured light on a welding workpiece base material and a curved line segment formed by irradiating the single line structured light on a concave surface of the weld pool;
fitting the straight line segment using a linear equation to acquire a straight line L, fitting the curved line segment using a polynomial equation to acquire a curved line C, and acquiring an area enclosed by the straight line L and the curved line C, wherein the area is used as the depression area S of the weld pool; and
performing square root operation on a depression area S of the weld pool to acquire the current value of the weld pool depression feature $\sqrt{S}$.

2. The control method for formation of a weld seam based on frontal visual sensing of the weld pool of claim 1, wherein the acquiring a foreground area comprises:
setting a perimeter of the connected domain of the binary images as P and the area as A; and
eliminating connected domains which satisfy $A/P^2 > \varepsilon$ and using remaining connected domains after the elimination in the connected domains of the binary images as the foreground area;
wherein $\varepsilon$ is a constant selected based on actual experience, and takes a value in the range of [0.01, 0.06].

3. A control device for formation of a weld seam based on frontal visual sensing of a weld pool, which is adopted in the control method of claim 1, comprising a welding unit, a visual sensing unit, and a calculation control unit;
wherein the welding unit comprises a welding torch configured to weld a welding workpiece;
the visual sensing unit comprises a structured light source and a visual sensor respectively disposed on left and right sides of the welding torch; wherein the structured light source is configured to emit single line structured light and irradiate the weld pool by the single line structured light; the visual sensor is configured to collect structured light spot images formed by irradiating the single line structured light on surfaces of the weld pool and the welding workpiece and output the structured light spot images;

the calculation control unit comprises a computer, wherein the computer is connected to the visual sensor and is configured to receive the structured light spot images and process the structured light spot images, acquire a current value of the weld pool depression feature, and adjust a welding current of the welding torch based on a deviation between the current value and an expected value of the weld pool depression feature.

4. The control device for formation of a weld seam based on frontal visual sensing of a weld pool of claim 3, wherein the welding unit further comprises a welding power source, wherein the welding torch is connected to the welding power source, and the welding power source is connected to the computer; the welding power source is configured to output a welding current to the welding torch, and the computer adjusts the welding current of the welding torch by the welding power source.

5. The control device for formation of a weld seam based on frontal visual sensing of a weld pool of claim 3, wherein the welding unit further comprises a cooling water tank configured to cool the welding torch; wherein the cooling water tank is provided with a water tank water inlet and a water tank water outlet, and the welding torch is provided with a welding torch water inlet and a welding torch water outlet; and the water tank water outlet is connected to the welding torch water inlet, the welding torch water outlet is connected to the water tank water inlet, and the cooling water tank is connected to a welding power source.

6. The control device for formation of a weld seam based on frontal visual sensing of a weld pool of claim 3, wherein the welding unit further comprises a shielding gas storage tank; wherein the shielding gas storage tank is connected to a welding power source, and provides shielding gas to the welding torch through the welding power source.

7. The control device for formation of a weld seam based on frontal visual sensing of a weld pool of claim 3, wherein a band-pass filter is installed on the visual sensor, the band-pass filter allows the single line structured light to pass through.

8. The control device for formation of a weld seam based on frontal visual sensing of a weld pool of claim 3, further comprising a mounting plate, wherein the structured light source, the visual sensor, and the welding torch are mounted on the mounting plate, respectively; and axes of the structured light source, the visual sensor, and the welding torch are on a same plane; and the axis of the structured light source and that of the visual sensor are symmetric with respect to the axis of the welding torch, respectively.

* * * * *